June 23, 1959  J. B. LINDSAY  2,891,356
DEVICE FOR CLAMPING ELECTRODES AND THE LIKE
Filed July 8, 1955  3 Sheets-Sheet 1
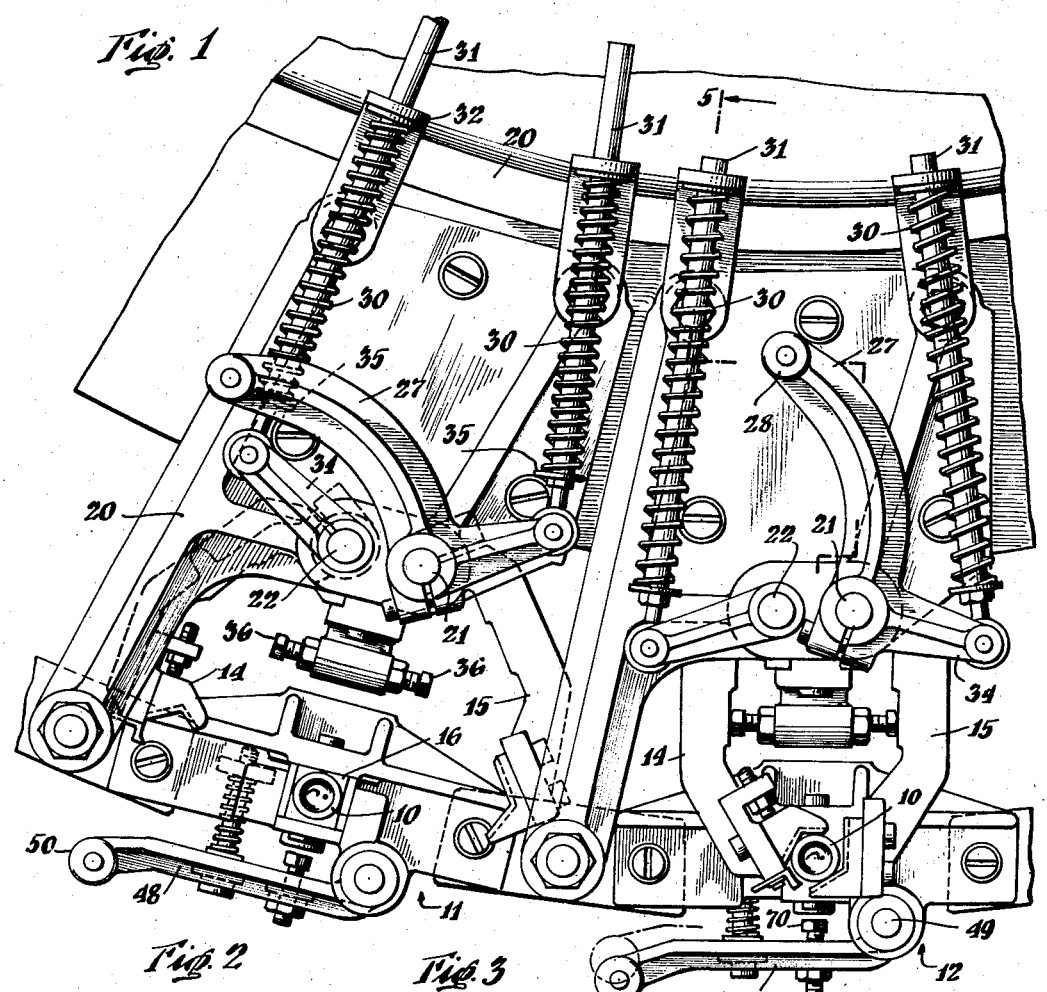
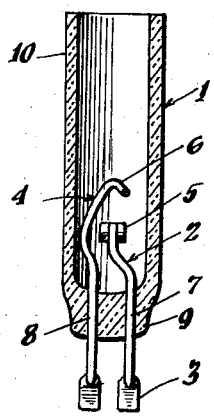
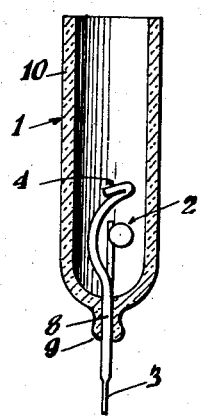
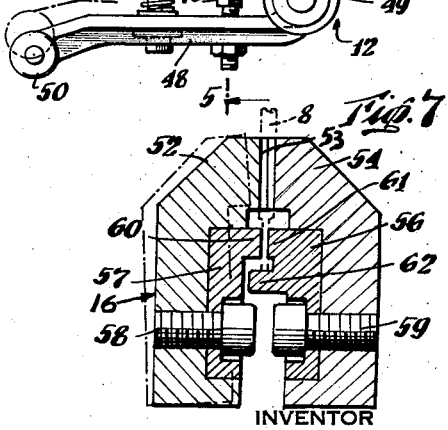
INVENTOR
James B. Lindsay
BY
Norman R. Holland
ATTORNEY

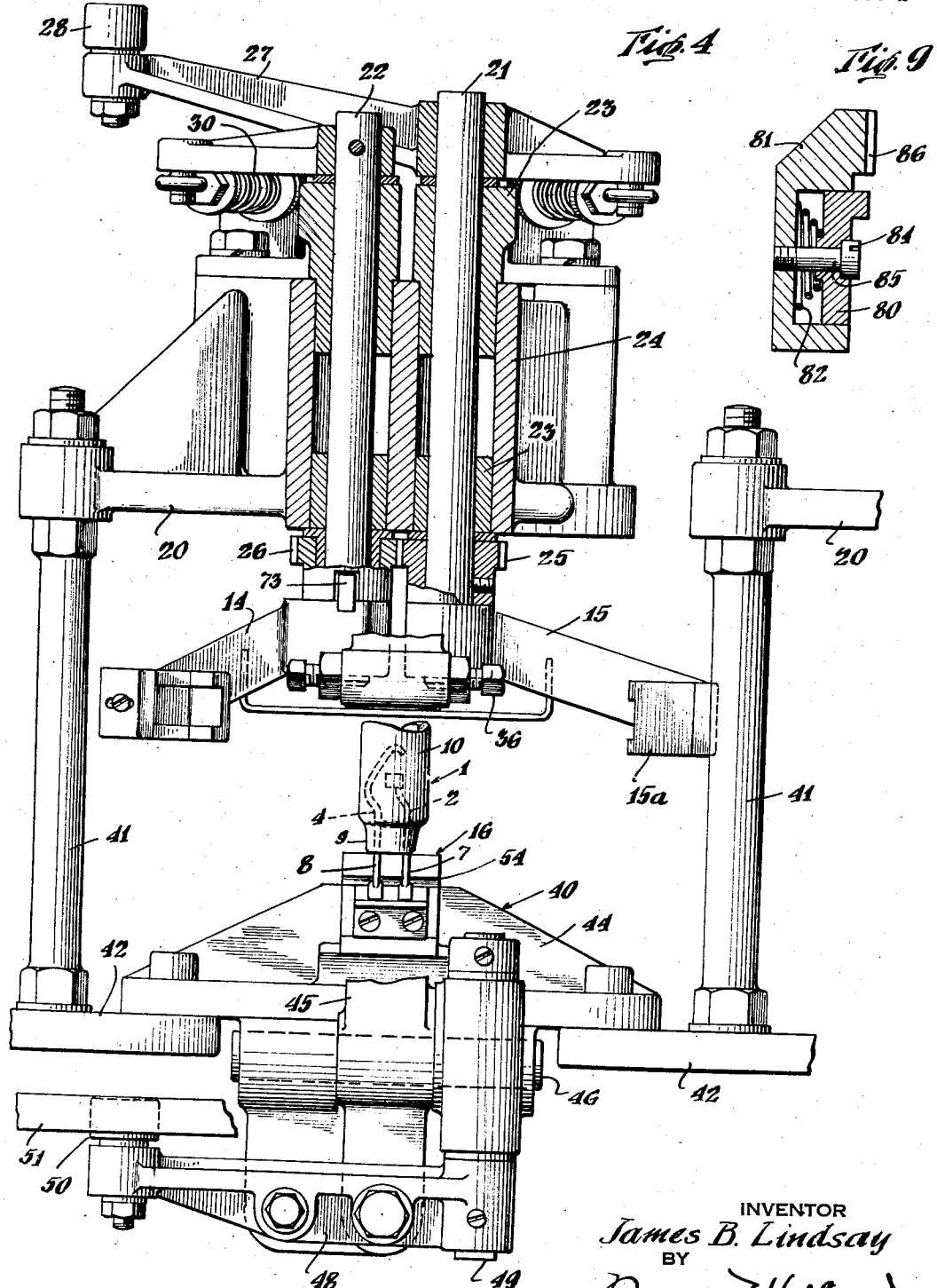

June 23, 1959 J. B. LINDSAY 2,891,356
DEVICE FOR CLAMPING ELECTRODES AND THE LIKE
Filed July 8, 1955 3 Sheets-Sheet 3
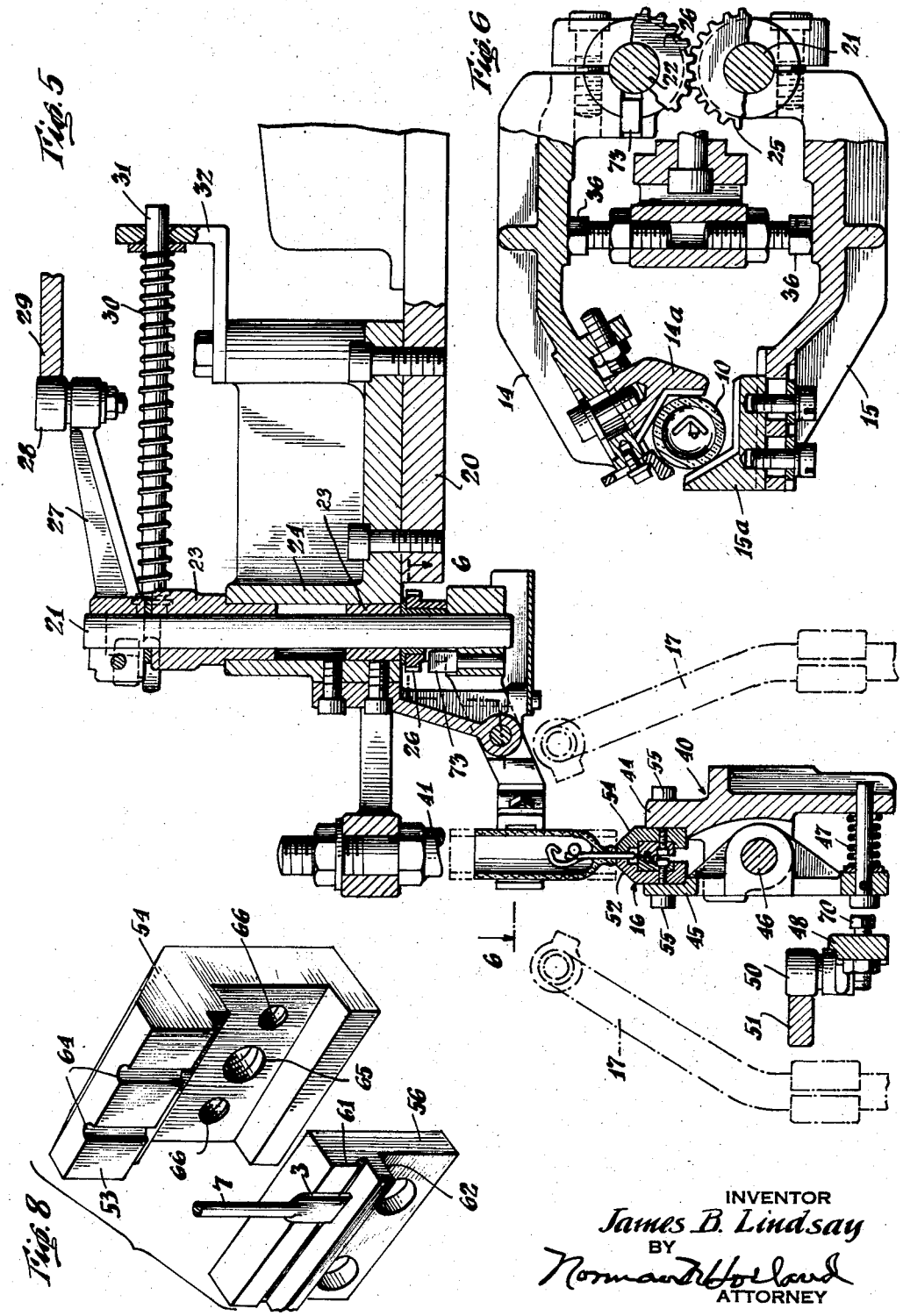
INVENTOR
James B. Lindsay
BY
ATTORNEY

United States Patent Office 2,891,356
Patented June 23, 1959

2,891,356

DEVICE FOR CLAMPING ELECTRODES AND THE LIKE

James B. Lindsay, Milburn, N.J., assignor to Kahle Engineering Co., North Bergen, N.J., a co-partnership Application July 8, 1955, Serial No. 520,755

4 Claims. (Cl. 49—2)

The present invention relates to a stem making device and more particularly to a means to position lead wires or electrodes being mounted in a tube stem, transistor envelope or similar device.

Machines are known which position electron tube lead wires during the forming of the glass stem so that the lead wires are aligned with the stem and with each other in a longitudinal sense, i.e., so that the lead wires are arranged to be parallel or to have some given angle with each other and with the glass stem. However, such machines have not heretofore aligned lead wires in a radial or rotational sense about their longer axis so that the lead wires are turned about their longer axis to a given relationship with each other and with the tube stem.

Some lead wires and their supported elements are symmetrical in cross section throughout so that their position with respect to their longitudinal axis is not critical. Such lead wires may be rotated about their longer axis to any position before they are mounted or inserted, however another important group of lead wires or lead wires and their integral supported elements must be carefully aligned both longitudinally and radially with respect to each other. Previously, where such alignments were required, the lead wires were positioned in the tube stem first and then special jigs and fixtures were used to attach the unsymmetrical portions to the lead wires or the lead wires with the elements attached were laboriously aligned in the stem making machine before the stem was formed.

Accordingly, an object of the present invention is to provide a device adapted to correctly align lead wires or electrodes radially and longitudinally during their insertion or positioning.

Another object of the present invention is to provide an improved automatic lead wire or electrode aligning means.

Another object of the present invention is to provide a relatively simple and efficient means for aligning lead wires for a stem making or a lead wire insertion machine.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

Fig. 1 is a fragmentary plan view of a stem making machine turret showing the lead wire aligning means of the invention;

Fig. 2 is a front elevational view in section of a partially formed glass tube having unsymmetrical electrodes;

Fig. 3 is a side elevational view in section of the tube of Fig. 2;

Fig. 4 is a fragmentary elevational view partially in section of a stem making machine turret having the lead wire aligning means of the present invention;

Fig. 5 is a sectional view taken along the line 5—5 of Fig. 1;

Fig. 6 is a sectional view taken along the line 6—6 of Fig. 5;

Fig. 7 is an elevational view in section of the electrode holder;

Fig. 8 is an exploded perspective view of the back of the electrode holder; and

Fig. 9 is a fragmentary sectional view of another embodiment of the electrode holder.

The invention will be described in connection with the positioning of two unsymmetrical electrodes in a mercury type switch, however it is to be understood that the invention is equally applicable to the positioning of lead wires and electrodes in other uses, such as in electron tubes, transistors or other devices.

Referring to the drawings, and particularly to Figs. 2 and 3, a partially formed mercury type of switch 1 is shown having two electrodes 2 and 4 which are electrically connected by liquid mercury when the switch 1 is tilted so that mercury within the tube 10 contacts both electrodes 2 and 4. Electrodes 2 and 4 have upper contact portions 5 and 6 and lower lead wire portions 7 and 8, respectively. In order to improve their operation, the contact portions 5 and 6 of electrodes 2 and 4 are formed with a special shape, as shown, and it is important to the proper functioning of the switch that these electrodes be correctly aligned with respect to one another and in stem 9 of switch 1.

The stem 9 on glass tube 10 of switch 1 is formed with electrodes 2 and 4 positioned therein on automatic stem making machinery. Such a machine comprises a horizontal rotating turret which is turned in a stepped fashion so that a plurality of work heads located on the circumference of the turret are presented consecutively to a group of fixed spaced work stations adjacent to the turret edge. The electrodes 2 and 4 and the tube 10 are loaded separately into the work heads and the work heads present them to the work stations, at each of which a given operation is performed to form the completed stem 9 mounting electrodes 2 and 4, as seen in Figs. 2 and 3.

My invention is incorporated in each of the work heads of a stem making machine to position the electrodes and it acts in cooperation with the stem forming operations of the machine, as will be explained more fully below.

Fig. 1 shows a fragmentary portion of the horizontal rotating turret of a typical stem making machine incorporating my invention. These machines are also known as sealing machines and the term stem making machine herein, including its use in the claims, refers as well to sealing machines and other similar devices. Two similar work heads, indicated at 11 and 12, are shown. Each work head comprises a pair of cooperating jaw members 14, 15 which are adapted to grip tube 10 and hold it in position for the stem forming operation. The jaws of work head 11 are shown in their open position before the insertion of tube 10. The jaws of position 12 are shown in their closed position gripping a tube 10. The jaws 14, 15 are mounted above a tube seat and electrode holder 16. As will be more completely described below, electrodes 2 and 4 are slipped into position in holder 16 when jaws 14, 15 are open, as at position 11. The tube 10 is then slipped over the electrodes and jaws 14, 15 close to hold the tube 10 in place (Fig. 5) during the forming of stem 9 by suitable heat treatment, such as by torches 17.

Jaw members 14, 15 are pivotally mounted on turret frame 20 on the lower ends of shafts 21 and 22 which are pivotally mounted in bushings 23 of bearing members 24. Shafts 21 and 22 are interconnected by gears 25 and 26 so that rotation of shaft 21 by cam lever 27 causes an equal and opposite rotation of shaft 22 to close or open jaw members 14, 15. Cam lever 27 is fixedly attached at one end to shaft 21 and has a cam follower roller 28 on its opposite end to contact a cam surface 29. Cam surface 29 is suitably shaped to turn lever 27 in a counterclockwise direction (Fig. 1) to open jaws 14, 15 and to allow lever 27 to turn in a clockwise direction under the influence of springs 30 to close the jaw members 14, 15 as the turret rotates from a tube loading position, such as is indicated at 11, to a tube working and stem forming position, such as is indicated at 12. Springs 30 are mounted so that they are compressed as jaw members 14, 15 are opened and so that in their compressed condition they urge shafts 21 and 22 to rotate so as to close jaw members 14, 15 on tube 10. The mounting for springs 30 comprises a rod 31 slidably mounted in bracket 32 at one end and pivotally attached at its other end to a crank 34 on the jaw member shaft 21 or 22. The spring 30 is confined between bracket 32 and a washer 35. Adjustable stops 36 limit the travel of jaw member 14, 15 toward their closed position and adjustable jaw tips 14a and 15a are moved to position tube 10 in the exact location desired.

*Tube seat and electrode holder*

The tube seat and electrode holder 16 and its mounting and operation will now be described. As seen in Figs. 1 and 4, the holder 16 is mounted on a suitable holder clamp 40 which is attached to turret frame 20 by support members 41 and 42. Clamp 40 has a fixed jaw 44 and a pivoted jaw 45 pivotally connected by a shaft 46. A spring 47 urges the top of pivoted jaw 45 toward fixed jaw 44. A cam lever 48 pivoted on shaft 49 is moved against the lower portion of pivoted jaw 45 by the engagement of cam roller 50, with a cam 51 to swing the top of pivoted jaw 45 away from the top of jaw 44. Electrode holder 16 comprises a front 52 and a back 54 attached to the pivoted jaw 45 and the fixed jaw 44 of bracket 40, respectively, by suitable bolts 55. The adjacent faces 53 of the holder front 52 and back 54 have cooperating grooves 64 which grip and align the electrodes 2 and 4 when the holder clamp 40 moves holder faces 53 together in its closed position (Fig. 5).

Beneath the holder faces 53 front and back electrode clamps 57 and 56 are removably attached by suitable bolts 58 and 59 to the electrode holder 16 front and back portions 52 and 54. A stop or supporting ledge 62 on back portion 54 supports electrodes 2 and 4, and cooperating clamping faces 60 and 61 of the electrode clamps 56 and 57 clamp the flat portion 3 of the electrodes and thereby rotate the electrodes about their longer axes to a desired position. Flat or reference portion 3 is formed on the electrode during its manufacture and before it is loaded into the holder 16. The surfaces of portion 3 are oriented with a given relation to the remainder of the electrodes to provide a fixed reference surface for clamps 56 and 57.

When the electrodes are being dropped into holder 16 by a suitable loading device, the pivoted portion of clamp 40 is rotated by the action of cam 51 through follower 50 and lever 48 to swing the front 52 of holder 16 away from its back 54 as shown by the dash-dot lines in Fig. 7. The amount of opening between the holder faces 53 can be set by adjusting contact screw 70 on cam lever 48 and preferably the opening is kept narrow enough to prevent the rotation of the electrodes about their axes to the point where the flattened portion 3 may be given a 180° reversal. The electrodes turned to approximately their desired position are now dropped freely into holder 16 against ledge 62 and opposite slots 64. Now, as the turret frame 20 is stepped to its next position, cam 51 is shaped to cause cam lever 48 to swing clear of pivoted jaw 45, allowing spring 47 to close holder 16 on electrodes 2 and 4. Slots 64 surround the electrodes to align them axially, and clamping faces 60 and 61 grip flattened portion 3 of the electrodes to rotate them about their longer axis to a predetermined position so that their upper portions 5 and 6 have a predetermined relation with each other.

Fig. 9 shows another embodiment of the electrode holder in which the electrode clamp 80 is resiliently mounted on holder 81 by the addition of spring 82 between clamp 80 and holder 81. Bolts 84 retain clamp 80 in place and they have a smooth bearing portion 85 which maintains clamp 80 in alignment. Clamp 80 is spaced from holder 81 so that clamp 80 and a similarly mounted clamp in an opposite holder will give sufficiently while clamping the flattened portion of an electrode to allow the slots 86 in the upper portion of the holder 81 to tightly grip the upper portion of the electrode. The spring 82 may be replaced by other suitable resilient means or by a suitable linkage which will resiliently urge clamp 80 away from holder 81.

Tube 10 is next placed in position on the top of holder 16 and between jaws 14, 15 so that a desired spacing exists between electrodes 2 and 4 and tube 10 during the succeeding forming operations on stem 9. As described above, jaws 14, 15 are controlled by cam surface 29 to close and grip tube 10 during the stem forming operation. Front and back electrode clamps 56 and 57 are preferably made removable so that they are replaceable when differently shaped electrodes require different spacing. Similarly, the front and back electrode holders 52 and 54 are made removable so that they may be replaced with holders having different groove sizes and spacings, as desired. When the stem 9 has been completed, the electrode holder 16 is opened by cam 51 through roller 50 and cam lever 48 to release the electrodes 2 and 4.

It can be seen that an improved electrode, pin or lead wire positioning means has been provided which positions them by aligning their longer axes as well as by rotating them about their longer axis to a desired position. The means is applicable to the positioning of lead wires in glass tube stems as well as to the positioning of lead wires on electrodes in transistor envelopes on other devices utilizing electrodes, lead wires or pins capable of being formed with a flattened clamping portion. The means disclosed is relatively simple and efficient and is also adapted for use with most known types of automatic pin mounting, stem forming or sealing machines. This means is also sufficiently versatile and adjustable in its operation so that it can handle a wide variety of lead wire, electrode or other pin shapes and so that it can be rapidly adjusted during or between runs to change the styles and numbers of elements being handled.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. An electrode holder for gripping and aligning an elongated asymmetric electrode having a relatively flat reference portion and a cylindrical portion during its mounting at a predetermined position on an electrical device comprising the combination of cooperating front and back portions having confronting flat surfaces and being pivotally mounted with respect to one another to removably grip the electrode therebetween, said surfaces having cooperating positioning grooves formed therein and spaced upon said surfaces to be in registry when said surfaces are in confronting relationship to at least partially surround the cylindrical portion of the electrode to align the electrode, means for mounting said front and back portions for relative pivotal movement, cooperating clamping means on opposite faces of said front and back portions subadjacent said confronting flat surfaces and having opposed flat surface elements spaced to engage said electrode at its reference portion and to rotate the electrode about its longitudinal axis and within said cooperating positioning grooves until the surfaces of said clamping means are aligned with the surfaces of said reference portions, and a ledge on said electrode holder to position the electrode so that its reference portion is between said clamping means when its cylindrical portion is within said cooperating positioning grooves.

2. The electrode holder as claimed in claim 1 in which said cooperating clamping means on the opposite faces of said front and back portions are resiliently mounted thereon.

3. An electrode holder for gripping and aligning a plurality of asymmetric electrodes with each other and with respect to an electrical device, each of the electrodes having a flattened reference portion and a cylindrical portion, said electrode holder comprising the combination of cooperating front and back portions having confronting flat surfaces and being pivotally mounted with respect to one another to close on and removably grip the electrodes, a plurality of cooperating grooves formed therein and spaced upon said surfaces with opposite pairs in registry when said surfaces are in confronting relationship to at least partially surround the cylindrical portion of one electrode and to align the electrode axially with respect to the other electrodes, means for mounting said front and back portions for relative pivotal movement, cooperating clamps subadjacent said confronting flat surfaces and having opposed flat surface elements and being mounted on opposite faces of said front and back portions to grip the electrodes at their flattened reference portion and to rotate the electrodes about their longitudinal axes within said cooperating grooves until the flattened reference portions are aligned with the surfaces of said clamps, said grooves having a width greater than the electrode diameter whereby the electrodes are loosely held in said grooves while being rotated about their longitudinal axes by said clamps, and a ledge on said electrode holder mounted to position the electrodes so that their reference portions are between said cooperating clamps when their cylindrical portions are within said cooperating grooves.

4. The electrode holder as claimed in claim 3 in which said cooperating clamps on the opposite faces of said front and back portions are resiliently mounted thereon.

References Cited in the file of this patent

UNITED STATES PATENTS

| | | |
|---|---|---|
| 482,144 | Stirn | Sept. 6, 1892 |
| 2,565,126 | Flaws | Aug. 21, 1951 |
| 2,698,502 | Herzog | Jan. 4, 1955 |
| 2,707,848 | Pityo | May 10, 1955 |